(12) United States Patent
Raju et al.

(10) Patent No.: US 7,334,061 B2
(45) Date of Patent: Feb. 19, 2008

(54) BURST-CAPABLE INTERFACE BUSES FOR DEVICE-TO-DEVICE COMMUNICATIONS

(75) Inventors: Kartik Raju, Santa Clara, CA (US); Mehmet Un, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 11/313,873

(22) Filed: Dec. 20, 2005

(65) Prior Publication Data

US 2007/0143506 A1 Jun. 21, 2007

(51) Int. Cl.
G06F 3/00 (2006.01)
G06F 13/00 (2006.01)

(52) U.S. Cl. .................. 710/35; 710/307; 370/257; 370/536

(58) Field of Classification Search ............ 710/307, 710/35; 370/257, 536
See application file for complete search history.

(56) References Cited

U.S. PATENT DOCUMENTS

| | | | | |
|---|---|---|---|---|
| 5,603,041 A | * | 2/1997 | Carpenter et al. | .......... 710/307 |
| 5,689,659 A | * | 11/1997 | Tietjen et al. | ............... 710/307 |
| 5,919,254 A | * | 7/1999 | Pawlowski et al. | ......... 710/104 |
| 6,223,237 B1 | * | 4/2001 | McDermid | .................. 710/307 |
| 6,629,185 B1 | * | 9/2003 | Silver et al. | ................ 710/307 |
| 2006/0218332 A1 | * | 9/2006 | Boudreau | ................... 710/307 |

* cited by examiner

*Primary Examiner*—Glenn A. Auve
(74) *Attorney, Agent, or Firm*—Baker Botts L.L.P.

(57) ABSTRACT

Disclosed are interface buses that facilitate communications among two or more electronic devices in standard mode and burst mode, and bus bridges from such buses to a memory unit of such a device. In one aspect, interface buses group the data lines according to groups of bits, and include group-enable lines to convey a representation of which groups of data lines are active for each data transfer operation. In another aspect, exemplary interface buses include burst-length lines to convey a representation of the number of data bursts in a burst sequence, thereby obviating the need to provide sequential addresses over the bus. Exemplary bus bridges are capable of interpreting the signals on the interface bus and transferring data bursts between the interface bus and one or more memory units within the device.

19 Claims, 5 Drawing Sheets

BURST-CAPABLE INTERFACE BUSES FOR DEVICE-TO-DEVICE COMMUNICATIONS

FIELD OF THE INVENTION

The present invention relates to interface buses that facilitate communications among two or more electronic devices, and to bus bridges from such buses to a memory unit of such a device. More particularly, the present invention relates to enabling bursts of data to be communicated from one electronic device to another device or group of devices.

BACKGROUND OF THE INVENTION

In the network communications field, information is generally conveyed from one station to another in the form of packets. The sending station partitions the information to be sent in a series of packets, each with an identification header, sends them to the destination station, which reassembles original information from the packets. There are many tasks that are performed at each station to facilitate the handling of the packets. Generally established network communication standards divide the tasks into several protocol layers (generally around seven). The bottommost protocol layer is often called the "physical layer" or "PHY layer", and it is responsible for physically transmitting the packets and receiving the packets by way of a communications medium, which may be a fiber-optic connection, a wired connection, a wireless connection, or other types of connections. The upper protocol layers are often implemented in software running on a processor that sends and receives data and commands to the physical layer.

The layer immediately above the physical layer is called the link layer, or the media access control (MAC) layer. This layer has traditionally been implemented in software, but is increasingly being implemented in hardware. At the same time, packet communication networks are being asked to carry more data faster, and to provide more functionality. As part of making their invention, the inventors have recognized that these trends are moving toward creating bottlenecks in the software and hardware, and there will be a need in the art to address these pending bottlenecks.

SUMMARY OF THE INVENTION

The inventors have discovered that using one hardware processor to implement a link layer, or media access control (MAC) layer, does not fully address the aforementioned bottlenecks. The inventors have discovered that the bottlenecks in a link layer or a MAC layer can be effectively addressed by using two processor devices dedicated to specific tasks and interconnected together by an interface bus that facilitates communication of data in bursts of one or more bytes rather than a byte at a time. From this, the inventors have invented interface buses and bus bridges that enable data to be communicated among two or more electronic devices in bursts of varying byte size. While the inventors have developed their inventions for the field of packet communications, the present inventions have wide applicability to the field of electronics where devices need to communicate with one another.

Accordingly, one set of inventions according to the present application provides interface buses to enable data communications between two or more devices, where there are one or more memory storage locations distributed among the devices, each memory storage device having one or more memory locations. An exemplary interface bus comprises a set of address lines to convey a selection of one of a plurality of memory locations as a selected memory location for a data-transfer operation on the bus, at least one read/write line to convey an indication of whether a first type of data-transfer operation is to be performed on the interface bus, and a plurality of data lines for conveying the data to be transferred in a data-transfer operation involving a selected memory location. The selection of the memory location is based on an address value presented on the address lines by a device coupled to the bus. The first type of data-transfer operation either comprises a read operation of a selected memory location or comprises a write operation to a selected memory location.

In a first aspect of the bus-interface inventions, the data lines in exemplary embodiments are grouped into N groups of data lines, with N being at least two. In addition, the bus further comprises a plurality of group-enable lines for conveying an indication of which groups of data lines are to be used in a data-transfer operation involving a selected memory location. This aspect enables devices that work with data of different sizes to communicate with one another in a more efficient manner. In a second aspect of the bus interface invention, the exemplary embodiments further comprise one or more burst-length lines to convey a value representative of a number of L bursts of data to be conveyed in serial form over the bus. In a data transfer operation involving one or more bursts of data, the bursts of data are conveyed in serial form over the data lines, and are associated with a plurality of memory locations that includes the memory location selected by the address value present on the address lines. Whether the data transfer operation comprises a read operation or a write operation, only one memory address is required to specify the memory locations involved in the data transfer operation. The first and second aspects may be used together or separately in embodiments of the bus interface invention.

Another set of inventions according to the present application provides bus bridges to couple a device to an interface bus that enables data communications between two or more devices. An exemplary bus bridge comprises a bus-interface manager, a transaction buffer, a write buffer, a read buffer, and a memory-interface manager. The bus-interface manager monitors the interface bus for the type of operation being requested. If a read operation is requested, the bus-interface manager generates a transaction request and sends it to the transaction buffer. The memory-interface manager reads the transaction request from the transaction buffer, and generates a sequence of electrical signals to a memory unit to extract the requested data. The memory-interface manager then sends the requested data to the read buffer. In turn, the bus-interface manager reads the requested data from the read buffer and outputs it on its corresponding interface bus. For a write operation request, the bus-interface manager generates a transaction request, stores the write-data from the interface bus to the write buffer, and sends the transaction request to transaction buffer. The memory-interface manager reads the transaction request from the transaction buffer, reads the write data from the write buffer, and generates a sequence of electrical signals to the memory unit to store the data. While both read and write operation are handled by preferred bus bridges according to these inventions of the application, it may be appreciated that some embodiments may only handle read operations or may only handle write operations, in which case either the read buffer or the write buffer may be omitted, and the corresponding actions that work on the omitted buffer may also be omitted.

Accordingly, it is an object of the inventions of the present application to enable devices that work with different-size data elements to communicate with one another in a more efficient manner.

It is another object of the inventions of the present application to increase the data transfer rate of devices on the bus.

These and other objects of the present invention will become apparent to those skilled in the art from the following detailed description of the invention, the accompanying drawings, and the appended claims.

DETAILED DESCRIPTION OF THE INVENTION

In the following description, numerous specific details are set forth to provide a more thorough description of the specific embodiments of the inventions. It is apparent, however, that the inventions may be practiced without all the specific details given below. In other instances, well known features have not been described in detail so as not to obscure the inventions.

The interface buses and bridges according to the present invention can be used to interface two or more electronic devices to one another, allowing efficient communication of information among the devices. In these communications, one of the devices initiates the data transfer operation, and is termed the "requesting device." The device that responds to the request to complete the data transfer operation is termed the "requested device." The interface buses and bridges according to the present invention are particularly well suited for interfacing a main processor with one or more secondary processors (generally called "slave processors" in the industry), where the main processor requests the secondary processor to perform specialized tasks. To better facilitate the interaction between the main and secondary processors, the inventors have found that it is advantageous for the main processor to read and write data directly to the memory unit(s) of the secondary processor. The data that is written to the secondary processor can comprise both data and instructions (e.g., requests). The data that is read from the secondary processor can comprise data, and in some cases instructions as well.

It may be appreciated that embodiments of the present invention may be constructed where the secondary processor reads and writes data to the memory unit(s) of the main processor, or where each of the main and second processors read and/or write data in the memory units of the other processor. It may also be appreciated that the secondary processor may be shared with two or more main processors over buses according to the present invention, or that a main processor may communicate with two or more secondary processors over buses according to the present invention. It may also be appreciated that a plurality of main processors may each request that tasks be performed by a plurality of secondary processors over buses according to the present invention.

Figure 1:
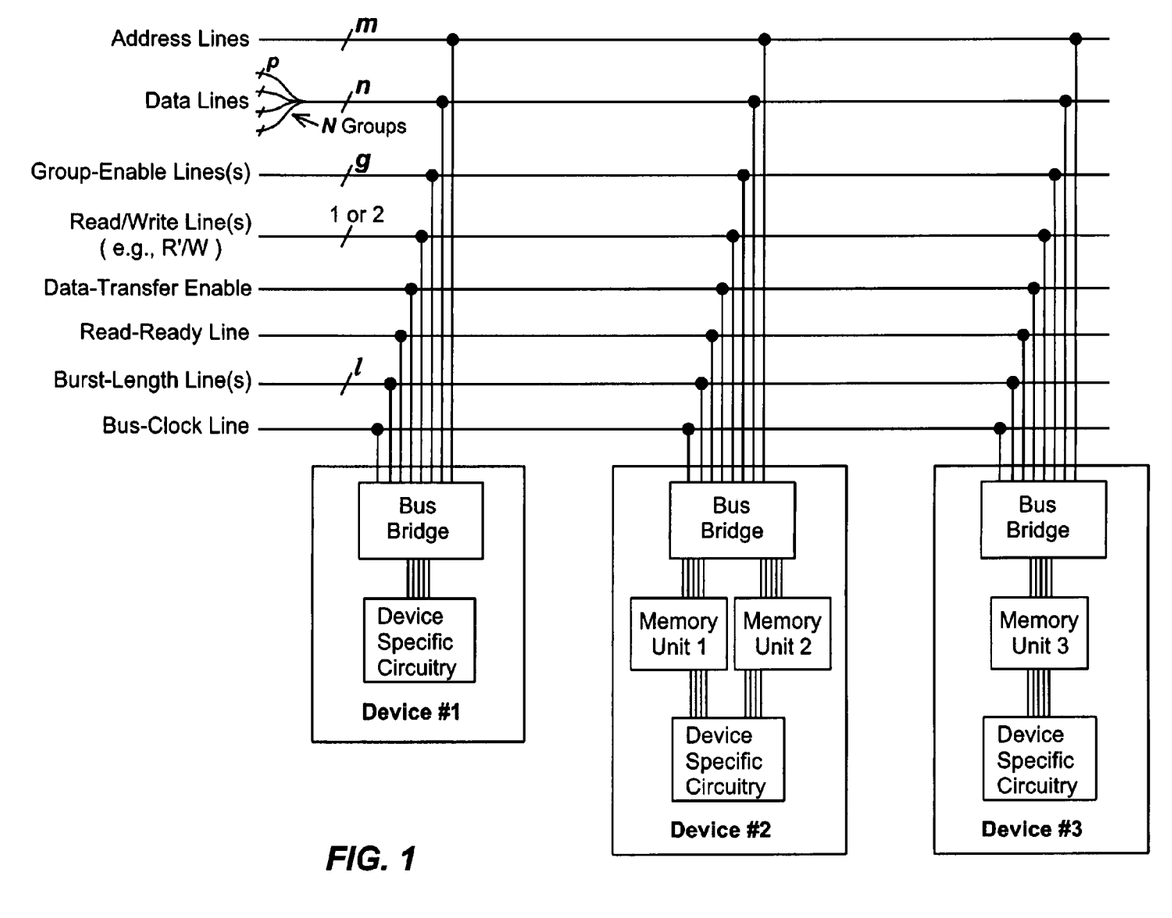
FIG. 1 shows a plurality of devices coupled together for communications by an exemplary interface bus according to the interface-bus inventions of the present application.

The inventors have also found that many devices, particularly predesigned and customizable processors that can be integrated onto a semiconductor chip, transfer data in different sizes, such as words (32 bits), half words (16 bits), and bytes (8 bits). As one advantageous effect, the present inventions enable devices that handle data in different sizes to communicate with one another. As another advantageous effect, the present inventions enable devices to transmit or receive bursts of data to speed up transfer operations, which compensates for instances where a byte-oriented device is transferring data to a word-oriented device (i.e., it compensates for data size mismatches). For providing these advantageous effects, preferred exemplary interface buses comprise the following signal lines: address lines for conveying address signals, data lines for conveying data signals, at least one read/write line for conveying at least one read/write signal, one or more group-enable lines for conveying group-enable signals, one or more burst-length lines for conveying burst-length signals, a clock line for conveying a clock signal, a data-transfer enable line, and a read-ready line. The bus lines are coupled to each of the devices on the bus, as illustrated in FIG. 1. Each of the devices is permitted to read the values present on the lines and, when needed by a data transfer operation, permitted to set the values of one or more of the lines (such as by way of a tri-state connection or the like). The signal lines are described below in greater detail. Depending upon particular implementation requirements, some of the lines may not be needed, or may not need to be coupled to all of the devices.

Address lines. One or more memory units are distributed among the devices coupled to the bus, with each memory unit having one or more memory locations that can receive, store, and/or provide data. A device, such as a primary processor, need not have a memory unit addressable by the address lines of the bus (this case is illustrated by Device #1 in FIG. 1). Each memory location is assigned a unique address (i.e., number). A set of m address lines (A[m-1:0]) conveys a selection of one of the memory locations as a selected memory location for a data-transfer operation on the bus. The selection is based on an address value presented on the address lines by a device coupled to the bus, typically a device that is initiating or requesting a data transfer operation. A number m of address lines is capable of selecting up to $2^m$ memory locations, each of which typically holds a byte in constructed embodiments of the present invention, but which may hold more or less (e.g., word or nibble). The address lines may be ordered from most-significant bits to least-significant bits, which is a standard convention. The memory locations may be congregated at one memory unit at one device (e.g., a secondary processor), or may be divided among two or more memory units at one device or multiple devices. In the latter case, which is illustrated by Devices #2 and #3 in FIG. 1 for generality, selective bit patterns in the most significant bit(s) may be used to select among the various memory units. For example, in the case of a single secondary processor having two memory units (Device #2), one for data and another for instructions, the most significant bit can be used to distinguish between the two by using "0" to identify the instruction memory unit and "1" to identify the data. As another example, where four memory units are distributed among a number of devices, bit patterns in the two most significant bits may be used to distinguish among the four as follows: "00" for the first memory unit, "01" for the second memory unit, "10" for the third memory unit, and "11" for the fourth memory unit. Recognition of the bit pattern by a device or memory unit may be accomplished by decoding logic coupled to the most significant address line(s), the design of which is well-known in the art.

Data Lines. There are n data lines (D[n-1:0]) for conveying the data to be transferred in a data-transfer operation involving at least the memory location selected by way of the address lines. The data lines are apportioned into N groups of data lines, preferably with the same number p of data lines in each group, and with N being at least two. In typical applications, n is equal to 32, and N is equal to 4, with eight data lines in each group (i.e., byte wide). The group organization of the data lines, in combination with the group-enable lines described below, enables word-oriented devices, half-word-oriented devices, and byte-oriented devices to communicate with one another over the interface bus.

Group-Enable lines. In preferred embodiments, there is a group-enable line (GE[g-1:0]) for every group of data lines. Each group-enable line conveys a signal indicating whether its corresponding group of data lines is to be used in a data transfer operation. In preferred embodiments, the number g of group-enable lines is equal to the number N of groups of data lines. So for example, when there are 32 bit lines grouped as four groups, one byte per group, there are four group-enable lines. In these embodiments, the group-enable lines may be called "byte-enable lines" since the signal on each such line indicates whether its corresponding byte in the data lines is to be read or written to, depending on the setting of the read/write line(s). In exemplary embodiments, the signals on the group-enable lines have the active-low orientation, with a "0" value indicating that the corresponding group of data lines is to be used, and with a "1" value indicating that the corresponding group is not to be used. But in general, the group-enable lines may have either the active-high or the active-low orientation. Below, Table I lists the states (active-low orientation) of the group-enable lines that are commonly used in preferred embodiments for N=g=4, and p=8, along with the amount of data enabled for each burst of a transfer operation. The value on the address lines and the value on the group-enable lines determines which memory locations are read or written to, depending on the state of the read/write line(s). This is explained in greater detail below after the other bus lines are described.

TABLE I

| GE[0] | GE[1] | GE[2] | GE[3] | Amount of Data Enabled for Transfer |
|---|---|---|---|---|
| 0 | 0 | 0 | 0 | Whole word |
| 0 | 0 | 1 | 1 | Upper half word (most significant HW) |
| 1 | 1 | 0 | 0 | Lower half word (least significant HW) |

TABLE I-continued

| GE[0] | GE[1] | GE[2] | GE[3] | Amount of Data Enabled for Transfer |
|---|---|---|---|---|
| 0 | 1 | 1 | 1 | Leftmost byte (most significant byte) |
| 1 | 0 | 1 | 1 | Middle left byte |
| 1 | 1 | 0 | 1 | Middle right byte |
| 1 | 1 | 1 | 0 | Rightmost byte (least significant byte) |

Figure 2:
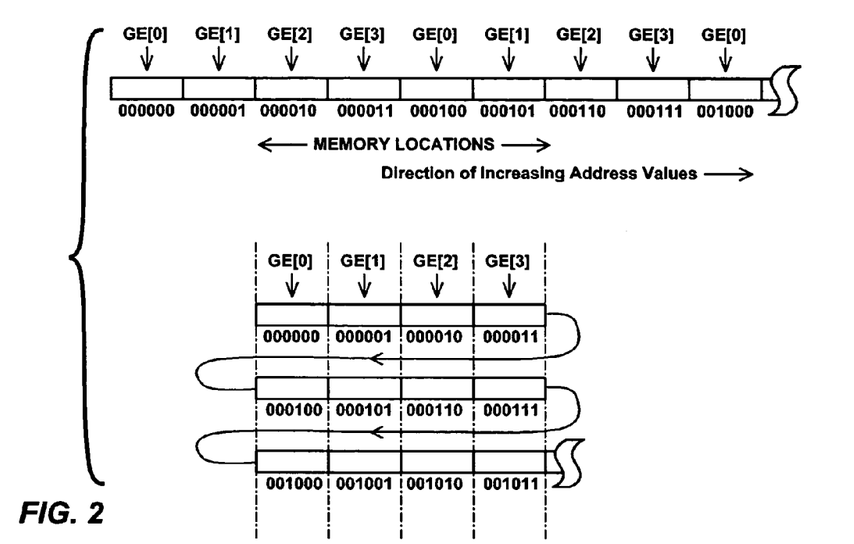
FIG. 2 shows an exemplary association between memory locations and group-enable lines according to the interface-bus inventions of the present application.

In preferred embodiments, each group of data lines and its corresponding group-enable line are associated with a unique bit pattern on the two least significant bits of the address lines. Specifically, referring to FIG. 2, the most significant byte of the data lines and group-enable line GE[0] are associated with memory addresses ending in "00"; the second most significant byte and group-enabled line GE[1] are associated with memory addresses ending in "01"; the third most significant byte and group-enable line GE[2] are associated with memory addresses ending in "10"; and the least significant byte of the data lines and line GE[3] are associated with addresses ending in "11." Furthermore, in these preferred embodiments, when writing or reading a byte of data, the requesting device activates the group-enable line that is associated with the bit pattern that it has placed on the two least-significant address lines. The data for the transfer operation is placed on the group of bit lines associated with the address bit pattern and the activated group-enable line, by either the requesting device in the case of a write operation or the requested device in the case of a read operation. When writing or reading a half-word of data, the requesting device places the address of the most significant byte of the half-word on the address lines, and activates the group-enable lines for that byte and the other byte in the half-word. Specifically, when writing or reading a half-word starting at an address location whose address has the least significant bits "00," group-enable lines GE[0] and GE[1] are active; when writing or reading a half-word starting at an address location whose address has the least significant bits "10," group-enable lines GE[2] and GE[3] are active. The data is provided on the two groups of data lines corresponding to the two activated group-enable lines. In preferred embodiments, half-words are not written at memory locations whose starting addresses have the least significant bits of "01" and "11." However, such actions may be done in more general embodiments of the interface-bus inventions. Finally, when writing or reading a word of data, the requesting device places an address that has the least significant bits of "00" on the address lines, and activates all group-enable lines. In preferred embodiments, writing words starting at an address location whose address has the least significant bits "01," "10," or "11" is not done, but may be done in more general embodiments.

While we have associated group-enable line GE[0] with the most-significant byte of the data lines and GE[3] with the least-significant byte, it may be appreciated that the assignments *may be reversed, with GE[0] associated with the least-significant byte and GE[3] associated with the most-significant byte. Also, while preferred embodiments use one group-enable line GE[x] for every group of data lines, it may be appreciated that an indication of which groups of data lines are to be used in the data transfer operation may be conveyed in encoded form on a fewer number of group-enable lines. For example, the seven common selections of groups shown in TABLE I may be encoded onto three group-enable lines as a unique binary number for each common selection. The encoded binary number on the group-enable lines may then be decoded by conventional decoding circuitry. In either case, the group-enable lines convey an indication of which groups of data lines are to be used in a data-transfer operation.

Read/Write line(s). The one or more read/write lines convey corresponding read/write signal(s) that may be configured according to any standard convention. Typically, only one line is used, usually named as R'/W, with a "0" state indicating that a read operation is to be done, and a "1" state indicating that a write operation is to be done. As another approach, two separate lines may be used, one to indicate a read operation and another to indicate a write operation, with each line having either the active-high or active-low orientation. In instances where two or more devices need to initiate read and/or write operations, each of the devices may have tri-state output ports that are connected to the one or more read/write lines (wired-OR configurations, while less preferred, may also be used).

Clock Line. The clock line conveys a bus-clock signal (BUSCLK) that alternates between two logic states in a periodic manner, with two adjacent logic states being a clock cycle. The bus-clock signal serves several purposes. First, the requesting device (the device initiating a data transfer) can use the states and/or edges of the clock signal to coordinate the generation and provision of the signals to the address lines, read/write line(s), data lines (in case of a write operation), group-enable lines, burst-length line(s), and data-transfer enable line. (A clock edge occurs when the clock signal transitions from one state to another.) Second, the requested device (the device being read or written to) can use the states and/or rising/falling edges of the clock signal to coordinate the tasks it needs to do to complete the data transfer operation at its end. Third, in a read operation, the states and/or edges of the clock may be used to indicate when the requested device is to provide stable and valid signals on the data lines, and to indicate when the requesting device can obtain this data from the data lines. Fourth, during burst-mode operations (described below), the cycles of the clock signal can be used to delineate the individual bursts of data in a burst sequence. Fifth, for those devices which require more than one clock cycle to obtain the data requested by a read operation, the clock can be used by such devices to build in wait states on the bus (in coordination with the read-ready signal described below).

Data-Transfer Enable Signal. The data-transfer enable (DTE) line conveys a signal indicating when a data-transfer operation is ready to begin. The DTE signal has a first state to indicate that the operation is ready, and a second state to indicate that the operation is not ready. The DTE signal may have the active-high or the active-low orientation. For the purpose of illustrating the present inventions, and without loss of generality, the DTE signal will be shown with the active-low orientation (first state is "0," second state is "1"). After the prior data-transfer operation is completed, the signals on the address lines, data lines, the group-enable lines, the read/write line(s), and the burst-length lines (described below) will have to switch to new states to prepare for the next data-transfer operation. Except for the data lines when the next transfer operation is a read operation, these signals are to be stable by the time the DTE signal enters its first state or shortly thereafter (usually before the next clock edge), and the DTE signal serves to notify the devices on the bus that the input signals needed for the next data-transfer operation are stable and valid. As an example of one implementation of the invention, the DTE signal may enter its active state shortly after the rising edge of the bus-clock signal, indicating that the bus lines needed for the next transfer operation will be valid and stable by the next falling edge of the bus-clock signal.

In those embodiments of the present invention where two read/write lines are used, one to indicate a read operation and another to indicate a write operation, the DTE function may be incorporated into these read/write signals, and the DTE line and DTE signal may be omitted. Specifically, each of the read/write signals may enter its respective active state to indicate that the above-mentioned bus signals are stable and valid, or will be by the next clock edge, and the devices on the bus may look to the read/write signals to determine when the above-mentioned signals are to be stable and valid.

Read-Ready Line. The read-ready line (RDRY) conveys a read-ready signal from the requested device to indicate to the requesting device that the data is ready and will be available on the next clock edge or clock state that has been designated for reading data from the data lines.

Burst-length lines. Data can be read or written over the bus one burst of data at a time, which is called the standard mode, or in a sequence of several bursts, which is called the burst mode. Each burst can involve one or more groups of the data lines, or all of the groups. To enable the burst mode, exemplary interface buses according to the present invention have a number l of one or more burst-length lines (BL[l-1:0]) for conveying burst-length signals that indicate the desired length L of the burst sequence. The desired burst length L is indicated by setting the burst-length signals to corresponding logic states. For example, the logic states of three burst-length signals have eight unique state combinations, and can therefore indicate up to eight different values for the desired burst length. Three exemplary assignments of burst-lengths L to logic states are given below in TABLE II, with the understanding that more assignments are possible. The first exemplary assignment provides a linear increase in the burst length over the eight unique state combinations, while the second exemplary representation provides a logarithmic increase. The third exemplary representation only makes use of three of the eight state combinations, with an active-high state only occurring on one of the three burst-length lines at a time, with each line representing a corresponding burst length (e.g., 1, 4, or 8). An advantage of this assignment is that the device's circuitry for interpreting the burst-length lines can be simplified.

TABLE II

| States of the Burst-Length Signals | First Exemplary Assignment of Burst Lengths | Second Exemplary Assignment of Burst Lengths | Third Exemplary Assignment of Burst Lengths |
|---|---|---|---|
| 0 0 0 | 1, Standard | 1, Standard | Not Used |
| 0 0 1 | 2 | 2 | 1, Standard |
| 0 1 0 | 3 | 4 | 4 |
| 0 1 1 | 4 | 8 | Not Used |
| 1 0 0 | 5 | 16 | 8 |
| 1 0 1 | 6 | 32 | Not Used |
| 1 1 0 | 7 | 64 | Not Used |
| 1 1 1 | 8 | 128 | Not Used |

Mapping of Burst Data to Memory Locations. As indicated above, in typical embodiments of the present invention, each memory location holds a byte of data. In general, the number of data bits held by a memory location, which we call $b_{ML}$, should be a common denominator of the data sizes used by the devices coupled to the bus. In other words, the data sizes used by the devices (e.g., word, half-word, byte)

should each be an integer multiple of the data size of the memory location. For example, if the bus hosts devices that are word-, half-word-, and byte-oriented, then it is preferred that each address location hold a byte of data. As another example, if the bus hosts only devices that are word- and half-word-oriented, then each address location should hold a half-word of data or a byte of data. The number p of data lines in each group of data lines should be equal to $b_{ML}$ (as measured in bits) or an integer multiple thereof. In addition, there is preferably an association between the group-enable lines and the bit patterns in the least significant bits of the memory's addresses, an example of which was previously discussed above with reference to FIG. 2.

Figure 3:
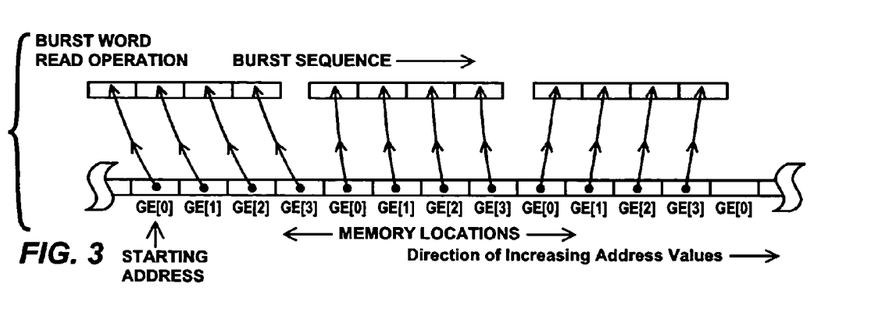
FIGS. 3-8 illustrate various exemplary mappings of burst data and memory locations of a memory unit being processed according to signals conveyed on the burst-length lines and group-enable lines according to the interface-bus inventions of the present application.
Figure 4:
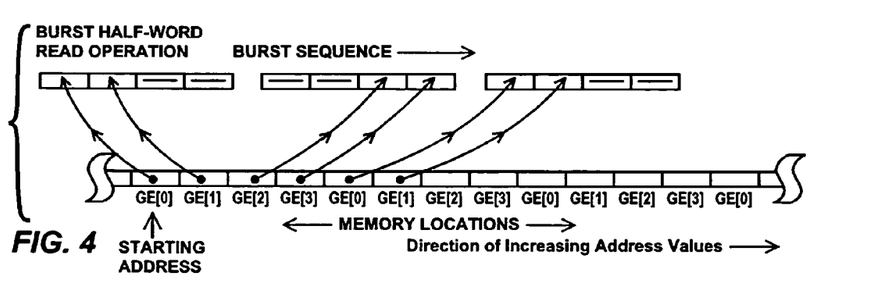
Figure 5:
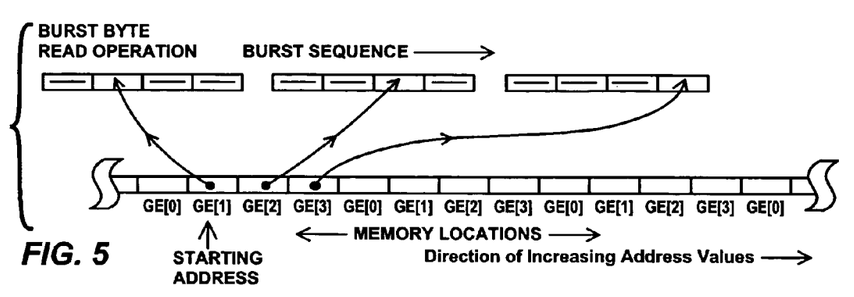

In a read operation where L bursts of data are requested with G groups of data lines being enabled, a number of $T_{ML}$ memory locations from the memory unit (the one having the memory location selected by the address value on the address signals) are read in sequential order, including the selected memory location, where $T_{ML}=L*G*(p/b_{ML})$. The burst-read operation (and also the burst-write operation described below) typically starts the sequence at the selected memory address and ends at a memory location that is $(T_{ML}-1)$ memory locations above or below the selected memory location. The read data is output on the data lines in L bursts of G enabled groups of data lines, with the data being presented in accordance with the association between the group-enable lines and the values in the least significant bits of the memory's addresses from which the data came. When G=g (G=N), all of the group-enable lines are active, and there is a continuous mapping of read memory locations to the burst data. This is illustrated in FIG. 3 for the case of g=4, L=3, $T_{ML}=12$, p=8, and $b_{ML}=8$ (one word per burst). When G<g (G<N), there are gaps in the mapping of the read data to the burst data, and the requested device changes the values of the group-enable lines for each burst in order to maintain the association between the least-significant-bit address values of the read memory locations and group-enable lines. This is illustrated in FIG. 4 for the case of g=2, L=3, $T_{ML}=6$, p=8, and $b_{ML}=8$ (half-word per burst), and in FIG. 5 for the case of g=1, L=3, $T_{ML}=3$, p=8, and $b_{ML}=8$ (one byte per burst). In the examples shown in FIGS. 3-8, the starting address is the selected address presented on the address lines by the requesting device at the beginning of the read operation in FIGS. 3-5 and at the beginning of the write operation in FIGS. 6-8 (discussed next).

Figure 6:
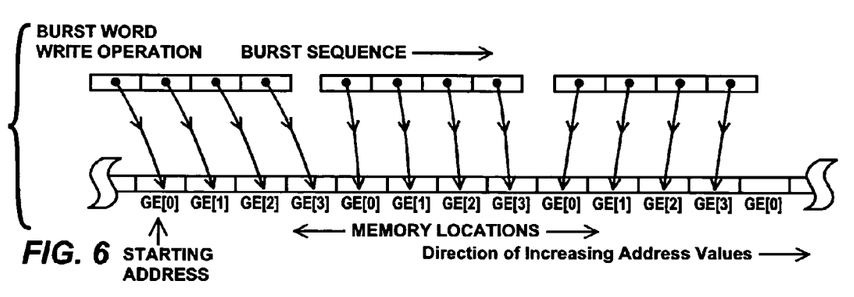
Figure 7:
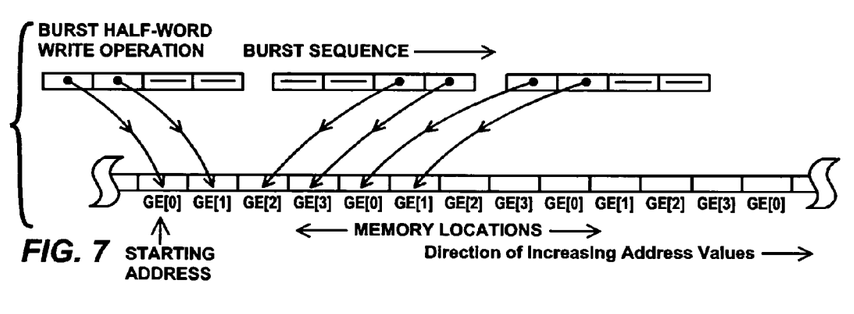
Figure 8:
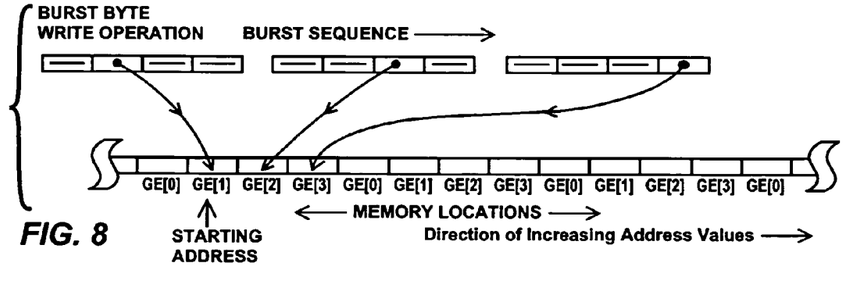

In a write operation where L bursts of data are written with G groups of data lines enabled, the data is extracted from the bursts according to the group-enable lines and written in sequential order to a number of $T_{ML}$ memory locations in the memory unit that holds the address selected by the address signals, including the selected memory address. The mapping of data during a write operation is similar to that during a read operation. When G=g (G=N), all of the group-enable lines are active, and there is a continuous mapping of the burst data to the memory locations. This is illustrated in FIG. 6 for the case of g=4, L=3, $T_{ML}=12$, p=8, and $b_{ML}=8$ (one word per burst). When G<g (G<N), there are gaps in the mapping of the write data to the memory locations, and the requesting device changes the values of the group-enable lines for each burst in order to maintain the association between the group-enable lines and the least-significant-bit address values of the memory locations to be written. This is illustrated in FIG. 7 for the case of g=2, L=3, $T_{ML}=6$, p=8, and $b_{ML}=8$ (half word per burst), and in FIG. 8 for the case of g=1, L=3, $T_{ML}=3$, p=8, and $b_{ML}=8$ (byte per burst).

Figure 9:
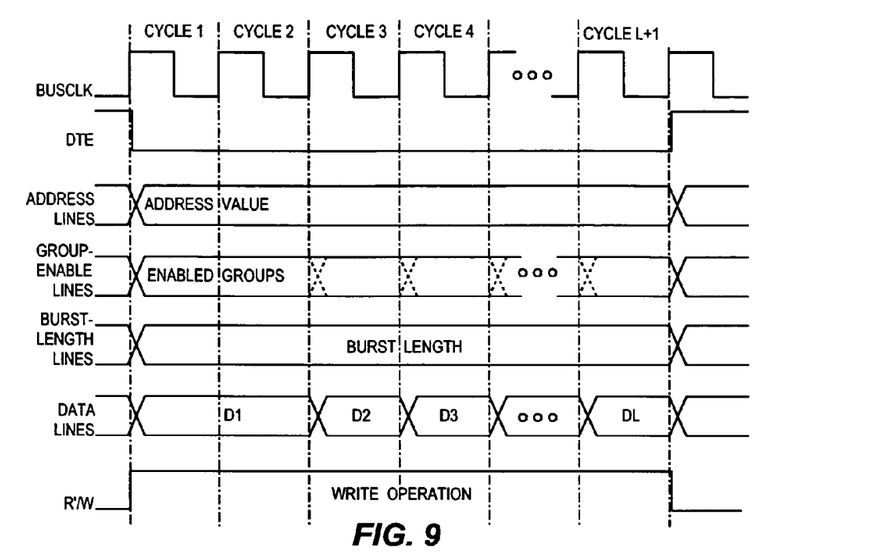
FIG. 9 illustrates a timing diagram of bus signals during a write operation for an exemplary embodiment according to the present invention.

Exemplary Timing Diagrams. FIG. 9 shows an exemplary timing diagram of a burst write operation of L bursts of data using an exemplary timing protocol for the bus signals. In the timing diagram, a plurality of cycles in the bus clock signal (BUSCLK) are shown at the top, with the cycles identified by numbers 1 through L+1. At the beginning of Cycle 1 (rising clock edge), the requesting device activates the DTE signal (active low) and sets the R'/W signal to indicate a write operation, and further generates valid values for the address lines, the group-enable lines, the burst-length lines, and the data lines by the time of the falling clock edge of the first cycle. On the falling clock edge, other devices on the bus latch in the bus signals and determine if the requested transaction pertains to them. The bus protocol allows one clock cycle (Cycle 2) for the requested device to make this determination and prepare for the write operation. On the rising edge of Cycle 3, the requesting device outputs the first burst of write data, and on the falling edge of Cycle 3, the data lines are valid and the requested device latches in the first burst of data. On the rising edge of Cycle 4, the requesting device outputs the second burst of write data and an updated set of group-enable signals, if needed, and on the falling edge of Cycle 4, the data lines are valid and the requested device latches in the second burst of data. The tasks done during Cycle 4 are repeated for the remaining bursts in the burst sequence, with the last burst being processed in Cycle L+1.

By the end of Cycle L+1, the requesting device removes its signals from the bus lines, with the DTE line being placed in its inactive state. A new data transfer request can then begin at the next clock cycle, either by the previous requesting device or a new requesting device. Various protocols may be established beforehand to assign slices of time to the devices on the bus to prevent two devices requesting a data transfer operation at the same time. As one simple example for the case of three devices, the DTE line may have a low-current pull-up load coupled to it to keep it in a high state (inactive state) when none of the devices is requesting a transfer operation, and each device may track the number of clock cycles that the DTE line has been held inactive since the completion of the last data transfer operation. Device #2 can be designated to initiate a data-transfer request after the occurrence of one inactive cycle, and at every third consecutive inactive cycle thereafter (e.g., 1, 4, 7, . . . ). Device #3 can be designated to initiate a data-transfer request after the occurrence of two consecutive inactive cycles, and at every third consecutive inactive cycle thereafter (e.g., 2, 5, 8, . . . ). Device #1, which can be designated as having primary control over the bus, can be designated to initiate a data-transfer request immediately after the completion of the previous data-transfer request, and after the occurrence of three consecutive inactive cycles and at every third consecutive inactive cycle thereafter (e.g., 3, 6, 9, . . . ). In addition, Device #1 is limited to a finite number of consecutive bus operations so as to give some time to Devices #2 and #3 to initiate requests, and is preferably designated to initiate a read operation to an arbitrary address on the bus after a large number of consecutive inactive cycles so as to ensure that the devices are synchronized in the counting of the inactive cycles. It may be appreciated that various dynamic slot allocation protocols may be developed for the interface bus where active polling of the devices is done. This may be facilitated by allocating a common address to all of the devices to receive configuration messages and status inquiries from a device that has primary control over the bus.

Figure 10:
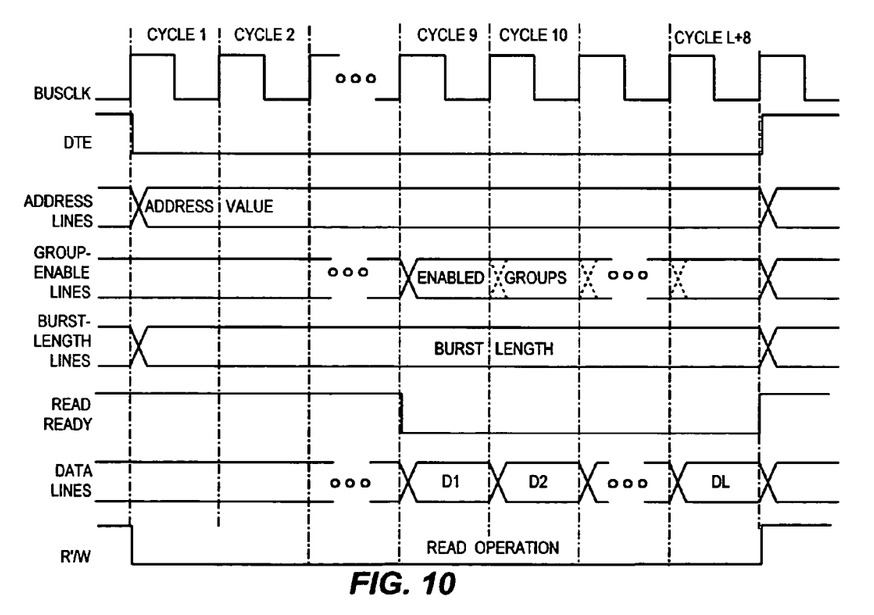
FIG. 10 illustrates a timing diagram of bus signals during a read operation for an exemplary embodiment according to the present invention.

FIG. 10 shows an exemplary timing diagram of a burst read operation of L bursts of data using an exemplary timing protocol for the bus signals. As in the previous timing diagram, a plurality of cycles in the bus clock signal (BUSCLK) are shown at the top, with the cycles identified by numbers 1 through L+8. At the beginning of Cycle 1 (rising clock edge), the requesting device activates the DTE signal (active low) and sets the R'/W signal to indicate a read operation, and further generates valid values for the address lines, the group-enable lines and the burst-length lines by the time of the falling clock edge of the first cycle. On the falling clock edge, other devices oh the bus latch in the bus signals and determine if the requested transaction pertains to them. The bus protocol allows one clock cycle (Cycle 2) for the requested device to make this determination and prepare for the read operation. A read operation typically takes several cycles to obtain the requested data and prepare it for transmission on the bus. In this example, we use the example of the device needing 7.5 clock cycles, starting from the falling edge in Cycle 1, to obtain and prepare the requested data for transmission. Therefore, the requested device places the read-ready signal line in an inactive state from the falling edge of Cycle 1 to the rising edge of Cycle 9. At the start of Cycle 9 (rising clock edge), the requested device sets the read-ready line in an active state (active low) and outputs the first burst of data on the data lines, along with an appropriate activation of group-enable lines for the burst. On the falling edge of Cycle 9, the data lines are valid and the requesting device reads the first data burst from the data lines, and reads the states of the group-enable lines. The requested device then maintains the read-ready line in an active state until the last burst is processed at Cycle L+8, and the other tasks done during Cycle 9 are repeated again for each of Cycles 10 through L+8 to transfer the remaining bursts in the burst sequence. By the end of Cycle L+8, the requesting device removes its signals from the bus lines, with the DTE line being placed in its inactive state.

Bus Bridge Inventions. An exemplary bus bridge according to the present invention for coupling an interface bus directly to the memory unit of a device is shown at 1000 in FIG. 11. Bus bridge has the ability of being selectively coupled to either a first interface bus "A" or a second interface bus "B," depending upon the logic state of a mode bit CMOD, which will be discussed in greater detail below. Bus bridge 1000 is also coupled to a memory unit MU, which in turn is coupled to circuitry that is specific to the device being served by bus bridge 1000. The interface buses "A" and "B," the memory unit MU, and the device-specific circuitry are not part of bus bridge 1000, per se. In constructed uses of the bus-bridge invention, the interface bus described above with reference to FIGS. 1-10 is provided as Bus "A," and the AHB system bus ARM corporation is provided as Bus "B."

Figure 11:
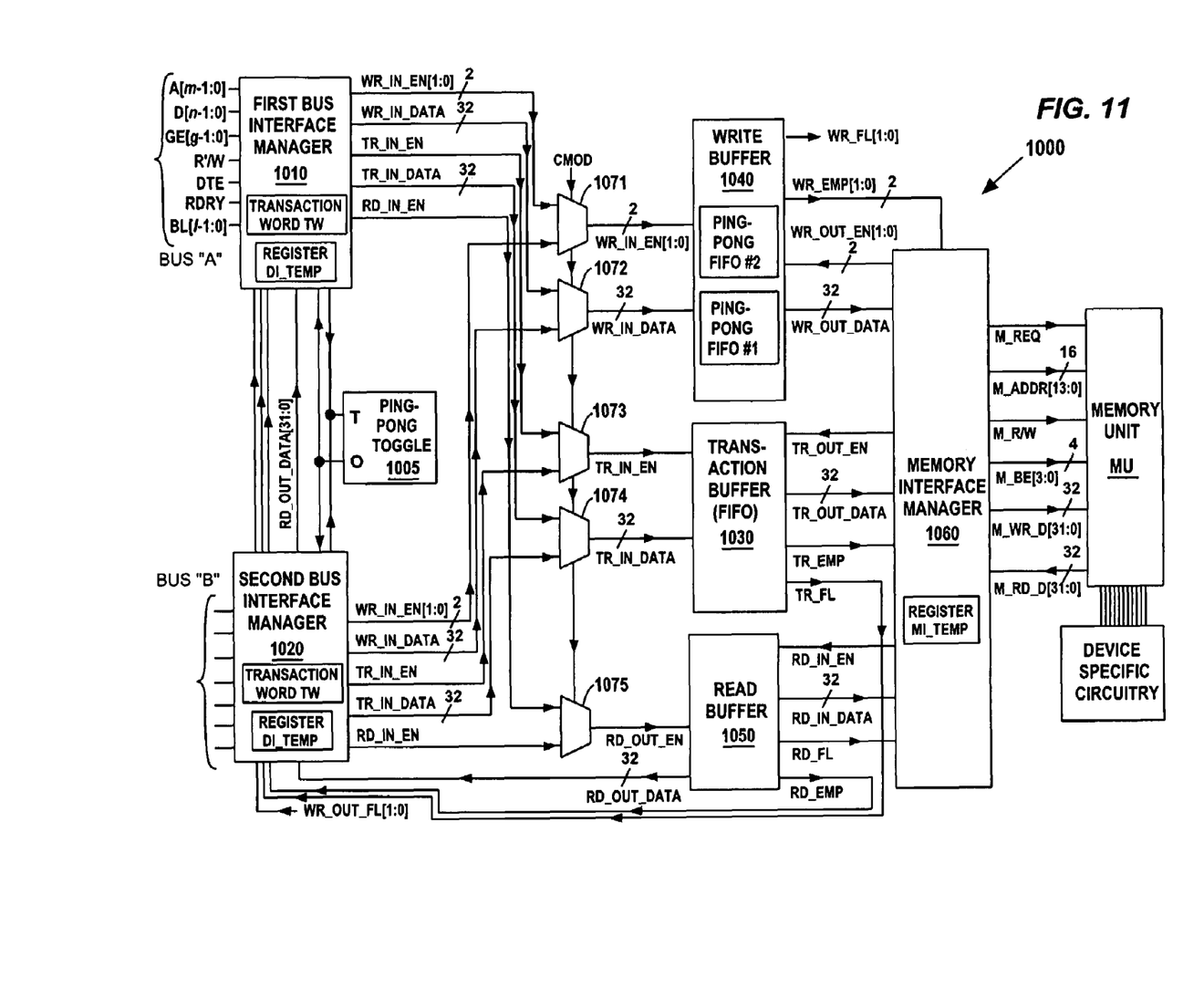
FIG. 11 is a schematic diagram of an exemplary bus bridge according to the bus-bridge inventions of the present application.

Bus bridge 1000 comprises a first bus-interface manager 1010, a second bus-interface manager 1020, a transaction buffer 1030, a write buffer 1040, a read buffer 1050, a memory-interface manager 1060, and a plurality of multiplexers 1071-1075. As an initial overview of the operation of bus bridge 1000, the mode bit CMOD and the multiplexers 1071-1075 select one of the bus-interface managers to be actively used by the bridge. This effectively couples the bus bridge 1000 to one of buses "A" and "B," depending upon the state of signal CMOD. The selected bus-interface manager monitors its corresponding interface bus for the type of operation being requested. If a read operation is requested, the bus-interface manager generates a transaction request (usually the size of a word or less), and sends it to the buffer input of transaction buffer 1030. Memory-interface manager 1060 reads the transaction request from the buffer output of transaction buffer 1030, and generates a sequence of electrical signals to memory unit MU to extract the requested data. Memory-interface manager 1060 then sends the requested data to the buffer input of read buffer 1050. In turn, the selected bus-interface manager reads the requested data from the output buffer of read buffer 1050 and outputs it on its corresponding interface bus. For a write operation request, the bus-interface manager generates a transaction request and stores the write data from its corresponding bus to the buffer input of write buffer 1040. After the data has been written, the bus-interface manager sends the transaction request to the buffer input of transaction buffer 1030. Memory-interface manager 1060 reads the transaction request from the buffer output of transaction buffer 1030, reads the data from the buffer output of write buffer 1040 and generates a sequence of electrical signals to memory unit MU to store the data.

The buffers 1030, 1040, and 1050 are next described. Transaction buffer 1030 comprises a first-in-first-out (FIFO) buffer having a buffer input (coupled to lines TR_IN_DATA (32) in the figure) to receive data words to be stored in a FIFO order, an input-enable port (coupled to line TR_IN_EN) to receive a signal indicating that data is ready at buffer input (TR_IN_DATA(32)) to be latched in, an output-enable port (coupled to line TR_OUT_EN) to receive a signal requesting it to output the oldest data word stored in the FIFO buffer, and a buffer output (coupled to lines TR_OUT_DATA(32)) to provide the oldest-stored data word in response to a request to output it. The input side and the output side of the FIFO buffer work asynchronously. That is, a first circuit (e.g., a bus-interface manager) inputs data to the buffer input using the input-enable port (TR_IN_EN) at a first schedule/clock-rate, and a second circuit (e.g., the memory-interface manager) reads out the stored data using the output-enable port (TR_OUT_EN) at a second and different schedule/clock-rate. In constructed embodiments, the output side and memory-interface manager 1060 work at a clock rate of 160 MHz; and the input side and the bus-interface managers 1010 and 1020 work at a clock rate that ranges between 30 MHz and 80 MHz. The number of data words stored in the FIFO buffer therefore varies with time because of the differences in the scheduling and clock rates at the input and output sides. To assist the circuits that feed data to and extract data from the FIFO buffer, transaction buffer 1030 further comprises a full-buffer output (coupled to line TR_FL) to indicate to other circuitry that the buffer is full and currently cannot accept more data, and an empty-buffer output (coupled to line TR_EMP) to indicate that the buffer is empty and has no more data to be read out. The FIFO buffer may be implemented as an addressable memory with a number of memory locations equal to a power of two (e.g., 4, 8, 16, etc.), a first register for holding an input pointer, a second register for holding an output pointer, and some control logic. The FIFO buffer is initialized with the input and output pointers pointing to the same memory location. When data is input to the buffer, it is written to the current location pointed to by the input pointer, and the input pointer is subsequently incremented. When data is read out of the buffer, it is read from the location pointed to by the output pointer, and the output pointer is subsequently incremented. When a pointer reaches the end of the memory space, it resets back (e.g., rolls over) to the beginning of the address space. When the input and output pointers have the same value, a signal at the empty-buffer output (line TR_EMP) is generated to indicate an empty state, otherwise the signal at the output indicates that data is available to be read out from the buffer (non-empty state). If the input pointer rolls over and advances to the address just below the address pointed to by the output pointer, a signal at the full-buffer output (line TR_FL) is generated to indicate a full state; otherwise, a signal at the full-buffer output indicates that the buffer has space to accept more data words (not full state).

Read buffer 1050 has substantially the same construction as transaction buffer 1030, but typically can hold more data words. Specifically, read buffer 1050 comprises a first-in-first-out (FIFO) buffer having a buffer input (coupled to lines RD_IN_DATA(32) in the figure) to receive data words to be stored in a FIFO order, an input-enable port (coupled to line RD_IN_EN) to receive a signal indicating that data is ready at buffer input (via lines RD_IN_DATA(32)) to be latched in, an output-enable port (coupled to line RD_OUT_EN) to receive a signal requesting it to output the last data word stored in the FIFO buffer, and buffer output (coupled to lines RD_OUT_DATA(32)) to provide the last-stored data word in response to a request to output it. Read buffer 1050 further comprises a full-buffer output (coupled to line RD_FL) to provide a signal indicating to other circuitry that the buffer is full and currently cannot accept more data, and an empty-buffer output (coupled to line RD_EMP) to provide a signal indicating that the buffer is empty and has no more data to be read out.

The construction of write buffer 1040 may be the same as that of read buffer 1050, but in preferred embodiments it comprises two FIFO buffers configured in a "ping-pong" arrangement: the two buffers being identified as ping-pong buffer #1 and ping-pong-buffer #2 in the figure. As each write transaction occurs, the associated write data is written to the two buffers in alternating fashion, with data for odd-numbered write transactions being placed in ping-pong buffer #1, and data for even-numbered write transactions being placed in ping-pong buffer #2, or vice-versa. When bus-interface manager 1010 writes a data word to write buffer 1040, it provides an additional signal indicating which ping-pong buffer is to be used. This signal is provided along with a convention signal to enable the input of data to the buffer. Likewise, when data is requested from the output, an additional signal is provided to the output side to indicate which ping-pong buffer to use. With that general background, write buffer 1040 has a buffer input (coupled to lines WR_IN_DATA(32)) to receive data words to be stored in FIFO order in one of the ping-pong buffers, a first input-enable port (coupled to line WR_IN_EN[0]) to receive a signal indicating that data is ready at buffer input (lines WR_IN_DATA(32)) to be latched in, a second input-enable port (coupled to line WR_IN_EN[1]) to receive a signal indicating which ping-pong buffer the data is to be written to, a first output-enable port (coupled to line WR_OUT_EN [0]) to receive a signal requesting it to output the last data word stored in a selected one of the ping-pong buffers, a second output-enable port (coupled to line WR_OUT_EN [1]) to receive a signal identifying the selected ping-pong buffer, and a buffer output (coupled to lines WR_OUT_DATA(32)) to provide the last-stored data word from the selected ping-pong buffer. Bus-interface managers 1010 and 1020 are responsible for alternating the selection of the ping-pong buffers by alternating the signal state presented on line WR_IN_EN[1], and by including a data bit in the transaction word indicating which ping-pong buffer has been used to store the write data. Write buffer 1040 further comprises two empty-buffer signals (coupled to lines WR_EMP[1:0], respectively) to indicate that the buffer is empty and has no more data to be read out. In practice, each ping-pong buffer has a buffer size equal to or greater than the maximum burst length (e.g., eight words of buffer space in the case where the maximum burst length is eight). As will be clear from the description below, if there are several write requests in succession, a filled ping-pong buffer will be emptied by the time the other ping-pong buffer is filled, and there will not be a risk of the ping-pong buffers being overfilled. Accordingly, in practice, there is not a need for the write buffer 1040 to have full-buffer outputs to indicate to other circuitry whether the ping-pong buffers are full and currently cannot accept more data. However, to provide a general description of all possible embodiments of the interface bus inventions of the present application, such fill-buffer outputs are shown in the figure (coupled to lines WR_FL[1:0], respectively). While complex, this buffer topology enables two successive write operations to occur with few or no wait states between the operations.

Multiplexers 1071-1075 and Mode Signal CMOD. The signals at the input side of buffers 1030, 1040, and 1050 are either coupled to respective outputs of first bus-interface manager 1010 or respective outputs of second bus-interface manager 1020, depending upon the value of mode signal CMOD. The selected coupling is provided by multiplexers 1071-1075, each of which is responsive to the state of mode signal CMOD and may be of conventional construction. Each of the multiplexers has two inputs, each being coupled to an output of a respective bus-interface manager, and an output coupled to a respective input of one of the buffers, as shown in the figure. When mode signal CMOD has a logic value of "0," the top inputs of the multiplexers are coupled through to the outputs of the multiplexers, thereby coupling first bus-interface manager 1010 to buffers 1030, 1040, and 1050. When mode signal CMOD has a logic value of "1," the bottom inputs of the multiplexers are coupled through to the outputs of the multiplexers, thereby coupling second bus-interface manager 1020 to buffers 1030, 1040, and 1050. Mode signal CMOD may be generated by conventional digital circuitry, or may be provided on an input pin to the semiconductor chip on which bus bridge 1000 is formed.

First Bus-Interface Manager 1010. For the purposes of illustration, and without loss of generality, first bus-interface manager 1010 is constructed to interface to the interface bus described above with reference to FIGS. 1-10. Bus-interface manager 1010, which can be implemented as a hardware state machine, mini-microprocessors, and the like, monitors the signals on the bus lines for requests for data transfer operations. Bus-interface manager 1010 preferably stores the values of the lines of Bus "A" in respective latches in response to the DTE signal entering its active state, with the storing preferably occurring on the clock edge of signal BUSCLK that followed the DTE signal entering its active state. Manager 1010 can reset the latches when the DTE signal enters its inactive state. Once the data has been latched, and if there is more than one memory unit addressable on bus "A," bus-interface manager 1010 determines if the address value provided on the address lines is for a memory location within memory unit MU. A particular bit pattern in the most significant address lines may be assigned beforehand to indicate memory unit MU, such as addresses starting with the most-significant bits of "01," and bus-interface manager 1010 can include a register to hold this value and a comparison circuit to compare the most significant bits of the latched address value with the bit values stored in the register to detect a match. The register may be volatile or nonvolatile. Instead of using a register, the comparison circuit may be hardwired to have the bit pattern for the most significant bits. The above tasks can be performed during the last part of Cycle 1 of clock signal BUSCLK shown in each of FIGS. 9 and 10.

If the address value on the bus does not belong to memory unit MU, bus-interface manager 1010 enters a waiting state until the DTE signal enters its inactive state. Otherwise, bus-interface manager 1010 begins to generate a transaction word that will be sent to the transaction buffer 1030. An exemplary format of the transaction word is shown below in TABLE III. The transaction word can be generated by logic circuitry having inputs coupled to the latched values of the bus signals and outputs directly coupled to the buffer input of transaction buffer 1030 (lines TR_IN_DATA(32)) through multiplexer 1074. The first 16 bits of the exemplary transaction word, TW[31:16], comprise an address value for memory unit MU, which may be taken directly from the latched states of the interface bus signals. The next four bits TW[15:12] indicate the burst length of the burst sequence, and can have up to 16 different designations of the burst length. However, as an example, only three burst lengths are used in the illustrated embodiment: a single burst, four bursts, and eight bursts, each being identified by a unique bit pattern in TW[15:12]. These three burst lengths are the same three burst lengths used in the last column of the above TABLE II. Using BL[2], BL[1], and BL[0] to designate the three burst-length lines of interface bus "A," transaction-word bits TW[15:12] can be generated as follows: TW[15]=BL[2], TW[14]=BL[1], TW[13]=0, TW[12]=BL[0]. This is a direct mapping of individual burst-length lines of the interface bus, and does not require any logic circuitry to implement. However, in general, a logic circuit can be used to effect any type of mapping that may be needed for other implementations. Transaction-word bits TW[11], TW[7], and TW[4:0] are reserved for possible future uses. Transaction-word bits TW[10:8] indicate the data size of the transaction, which may be byte, half-word, or word. These bits are generated from the states of the group enable lines GE[g-1:0] by conventional logic circuitry, as can be determined by the information presented in TABLE I above. Transaction-word bit TW[5] indicates whether a read operation or write operation is to be done on the selected memory addresses of memory unit MU. This value may be directly taken from the latched value of the read-write R'/W signal of the interface bus. Finally, if a write operation is to be done, transaction-word bit TW[6] indicates which ping-pong buffer to use, with a "0" value indicating ping-pong buffer #1 and a "1" value indicating ping-pong buffer #2. The value for bit TW[6] is read from a single-bit toggle 1005, which is toggled between its binary states each time it is read. Toggle 1005 has output port O to indicate its current state, and a toggle input T to receive a clock signal that instructs it to toggle its state. Bus-interface manager 1010 has an input coupled to output O, and uses the logic value of output O for transaction word bit TW[6]. Bus-interface manager 1010 also has an output coupled to the toggle input T, and sends an active signal to this input upon writing a transaction word to buffer 1030 that designates a write operation to memory unit MU. Accordingly, the transaction word TW[31:0] can be generated by simple logic circuitry within the last half of clock Cycle 1, and coupled to the buffer input of transaction buffer 1030 via multiplexer 1074 and lines TR_IN_DATA (32).

TABLE III

| Bits of the Transaction Word | | Contents |
|---|---|---|
| TW[31:16] | Address value for Memory Unit MU | |
| TW[15:12] | Burst Length | 0001 = Single Burst |
| | | 0100 = Four Bursts |
| | | 1000 = Eight Bursts |
| TW[11] | Reserved | |
| TW[10:8] | Data Size | 000 = Byte Transaction |
| | | 001 = Half-word Transaction |
| | | 010 = Word Transaction |
| TW[7] | Reserved | |
| TW[6] | R'/W | 0 = Read Transaction |
| | | 1 = Write Transaction |
| TW[5] | Ping-Pong Select | 0 = Ping-Pong FIFO #1 |
| | | 1 = Ping-Pong FIFO #2 |
| TW[4:0] | Reserved | |

In the case of a read operation (as determined by the value of TW[5]), bus-interface manager 1010 inputs the generated transaction word TW[31:0] into transaction buffer 1030 by generating an active signal on the buffer's input-enable port via line TR_IN_EN at the rising edge or the falling edge of Cycle 2 of clock signal BUSCLK (shown in FIG. 10). Bus-interface manager 1010 then waits for memory-interface manager 1060 to obtain the requested data and input it into the buffer input and input-enable port of read buffer 1050 via lines RD_IN_DATA(32) and RD_IN_EN, respectively. For this, bus-interface manager 1010 enters a waiting state (base state) where it monitors the empty-buffer signal of read buffer 1050 (via line RD_OUT_EMP), which will indicate an empty state until memory-interface manager 1060 inputs the first data word into read buffer 1050. Preferably, bus-interface manager 1010 monitors the signal on the empty-buffer line RD_EMP at the rising or falling edges of clock signal BUSCLK. During the waiting time, bus-interface manager 1010 maintains an inactive state on the read-ready line of interface bus "A."

Upon detecting a non-empty state, bus-interface manager 1010 reads the buffer output of read buffer 1050 by sending an active signal to the buffer's output-enable port via line RD_OUT_EN at the next rising edge of clock signal BUSCLK, which occurs at the start of Cycle 9 shown in FIG. 10. Also on the rising edge of clock Cycle 9, manager 1010 places the read-ready line of interface Bus "A" in an active state. The data read from read buffer 1050 is also routed to the data lines of interface bus "A" by bus-interface manager 1010, where it can be read by other devices on interface bus "A" at the falling edge of Cycle 9 or the rising edge of Cycle 10. Then, as long as the empty-buffer output of read buffer 1050 remains in an inactive state (indicating the presence of data words in the buffer), bus-interface manager 1010 repeats the following steps: sending an active signal to the output-enable port of read buffer 1050 via the RD_OUT_EN line at the next rising edge of the BUSCLK clock, thereafter reading out the data from lines RD_OUT_DATA(32) and routing it to the data lines of interface bus "A". When the last burst has been processed in this manner, bus-interface manager 1010 places the read-ready line in its inactive state and returns to its waiting state (base state).

When bus-interface manager 1010 outputs the data onto interface bus "A," it is preferred that it provide signals on the group-enable lines GE[g-1:0] during cycles 9 through L+8 (FIG. 10) indicating which bytes of the data lines BL[l-1:0] have valid data. The state of these lines can be determined from the values of the two least-significant bits of the address lines, as stored in bits TW[17:16] of the transaction word, and the data size as stored in bits TW[10:8] of the transaction word that were initially generated by bus-interface manager in Cycle 1 (FIG. 10). We take the example of g=4, and where the bits TW[10:8] indicate a data size from the following group: word, half-word, and byte. If bits TW[10:8] indicate a word as the data size, then bus-interface manager 1010 activates all group-enable lines GE[3:0] during Cycles 9 through L+8. If bits TW[10:8] indicate a half-word as the data size, then bus-interface manager 1010 alternately activates group-enable lines GE[1:0] on one cycle and group-enable lines GE[3:2] on the next cycle, starting with the activation of group-enable lines GE[1:0] at Cycle 9 if the bits TW[17:16]="00", or starting with the activation of group-enable lines GE[3:2] at Cycle 9 if the bits TW[17:16]="10." If TW[10:8] indicate a byte as the data size, then bus-interface manage 1010 sequentially activates each group-enable line GE[x] from low value of x (e.g., 0) to high values of x (e.g., 3), starting with an initial value $x_I$ that is determined from the values of bits TW[17: 16] as follows: $x_I$=0 for TW[17:16]="00", $x_I$=1 for TW[17: 16]="01", $x_I$=2 for TW[17:16]="10", and $x_I$=3 for TW[17: 16]="11". Bus bridge 1000 can be implemented without bus-interface 1010 providing this function, in which case, the function is done by the requesting device, and may be done according to the above-described sequence of actions.

As a simple way of performing the above process, memory-interface manager 1060 can execute the following sequence of actions using a temporary register DI_TEMP [15:0]:

1. Load the contents of the transaction word bits TW[31: 16], or the bit values of the address lines A[m-1:0] into temporary register DI_TEMP[15:0] before Cycle 9.
2. Execute actions #3 and #4 at each cycle from Cycle 9 through Cycle L+8 for the number of bursts L specified by transaction word bits TW[15:12].
3. Generate values for GE[3:0] as a function of TW[10:8] (data size) and the two least significant bits in temporary register DI_TEMP[1:0] according to the mapping shown in TABLE IV below before the falling edge of the cycle. This can be done by conventional logic circuitry.
4. After the falling edge of the cycle, increment the value of temporary register DI_TEMP[15:0] by one if TW[10:8] specifies "byte" as the data size, by two if TW[10:8] specifies "half-word" as the data size, or by four if TW[10:8] specifies "word" as the data size.

These actions can be integrated with the actions that bus-interface manager 1010 does to obtain the data bursts from read buffer 1050 and to provide them to the data lines D[n-1:0] of interface bus "A".

TABLE IV

| TW[10:8] | TW[17:16] | GE[0] | GE[1] | GE[2] | GE[3] |
|---|---|---|---|---|---|
| 0 0 0 | 0 0 | 0 | 1 | 1 | 1 |
| 0 0 0 | 0 1 | 1 | 0 | 1 | 1 |
| 0 0 0 | 1 0 | 1 | 1 | 0 | 1 |
| 0 0 0 | 1 1 | 1 | 1 | 1 | 0 |
| 0 0 1 | 0 0 | 0 | 0 | 1 | 1 |
| 0 0 1 | 0 1 | -- Not permitted -- | | | |
| 0 0 1 | 1 0 | 1 | 1 | 0 | 0 |
| 0 0 1 | 1 1 | -- Not permitted -- | | | |
| 0 1 0 | All values | 0 | 0 | 0 | 0 |

In the case of a write operation, bus-interface manager 1010 does not need to immediately input the transaction word into transaction buffer 1030, but can hold off until it can store some or all the write data from bus "A" into write buffer 1040. In constructed embodiments where memory-interface manager 1060 works at a faster clock rate than bus-interface manager 1010, the transaction word is input into transaction buffer 1030 after all of the data from bus "A" has been stored. To store the first data burst D0 for interface bus "A," bus-interface manager 1010 routes the latched state of the data lines on lines WR_IN_DATA(32) to the buffer input of write buffer 1040, couples the value of transaction-word bit TW[6] (ping-pong select) to write-enable line WR_IN_EN[1], and then generates an active signal on the input-enable port of buffer 1040 (line WR_IN_EN[0]) at one of the clock edges in Cycle 2, or at the rising edge of clock Cycle 3 (FIG. 9). Then, bus-interface manager 1010 latches in a new set of values of the data lines of bus "A" at the falling edge of clock Cycle 3 (to capture data word D2), couples the captured values to the buffer input of write buffer 1040, maintains the value of transaction word bit TW[6] on write-enable port via line WR_IN_EN [1], and subsequently generates an active signal on write-enable port via line WR_IN_EN[0] at the rising edge of clock Cycle 4. These four actions are repeated for the rest of the burst data to be received, which has been indicated with the values on the burst length lines BL[2:0] and the transaction-word bits TW[15:12]. Bus-interface manager 1010 may use a countdown register to process the burst data and the cycles, with the countdown register loaded with a value related to the burst length at the start of processing and decremented as each burst is stored. In constructed embodiments, bus-interface manager 1010 then clocks the write transaction word TW[3 1:0] into transaction buffer 1030 by generating an active signal on line TR_IN_EN at the next rising edge of Cycle L+2 of clock signal BUSCLK (FIG. 9), and the task of completing the transaction is handed off to memory-interface manager 1060. However, in general embodiments, the inputting of the transaction word may be done anytime between clock Cycles 2 and L+1. Bus-interface manager 1010 returns to its base state at Cycle L+2. The use of the ping-pong FIFO generally eliminates the possibility of over-writing data to write buffer 1040, and there is not a need for bus-interface manager 1010 to monitor the buffer-empty outputs of write buffer 1040 (via lines WR_FL [1:0]). However, some embodiments of bus-interface manager may do this monitoring, and may queue incoming data from Bus "A" if a full condition is detected on a ping-pong buffer.

Bus-interface manager 1010 can process additional write operations or a read operation without waiting for memory-interface manager 1060 to complete the previous write operation. However, in preferred embodiments, bus-interface manager 1010 monitors the full-buffer output of transaction buffer 1030 (via line TR_FL) to make sure there is room in the buffer before writing the next transaction word.

Bus-interface manager 1020 works in substantially the same way as bus-interface manager 1010, but operates with interface bus "B", which may be the same as, or different from, interface bus "A" in structure. From the above description of bus-interface manager 1010, one of ordinary skill in the art can construct bus-interface manager 1020 to work with the bus signals and protocols of any interface bus "B."

Memory-Interface Manager 1060. Memory interface manager 1060 communicates with memory unit MU using a conventional memory bus, but with the separation of the data lines into write-data lines M_WR_D[31:0] and read-data lines M_RD_D[31:0], and with the addition of four byte-enable lines M_BE[3:0]. For the purposes of illustration, and without loss of generality, memory unit MU stores a word of 32 bits at each of its memory locations, and each address value provided on its address lines M_ADDR[13:0] selects one memory location. In contrast, the address provided in the transaction word bits TW[31:16] address individual bytes of data rather than words of data. Therefore, only the 14 most significant bytes of TW[31:16] are needed to address a word in memory unit MU, and thus there are 14 memory address lines M_ADDR[13:0] rather than 16. The byte-enable lines M_BE[3:0] convey signals to indicate which bytes of the selected memory location of memory unit MU are written to during a write operation. The M_BE[3:0] signals are ordered such that M_BE[3] is assigned to the least-significant byte of the selected memory location, M_BE[2] is assigned to the next more significant byte compared to M_BE[3], M_BE[1] is assigned to the next more significant byte compared to M_BE[2], and M_BE[0] is assigned to the most-significant byte of the selected memory location. As described below in greater detail, memory-interface unit 1060 has a task of mapping the data bytes between the burst sequences and the byte locations in memory unit MU, as was previously illustrated in the examples of FIGS. 3-8. Finally, the other signals of the conventional memory bus include memory request line M_REQ, which has an active state to indicate a memory read or write operation, and a read-write line M_R/W to indicate either a read operation (M_R/W=0) or a write operation (M_R/W=1) to memory unit MU. Memory interface manager 1060 has an input coupled to receive the memory's read-word lines M_RD_D[31:0], and a plurality of respective outputs coupled to the above input lines of memory unit MU. For brevity, we will refer to the signals on these bus lines with names taken from the names given to the lines (e.g., the M_REQ signal is the signal conveyed on the M_REQ line, etc.).

As a side note, the device served by bus bridge 1000 has additional circuitry that is specific to the device's functions. This circuitry is identified in FIG. 11 as "DEVICE SPECIFIC CIRCUITRY," and is shown with general connections to memory unit MU. In many uses of bus bridge 1000, the DEVICE SPECIFIC CIRCUITRY will comprise a microprocessor or RISC processor that is connected to the memory bus for memory unit MU in the same manner that memory-interface manager 1060 is connected to the memory bus. In this case, the microprocessor or RISC processor may need more memory than that needed by bus-bridge 1000 or memory-interface manager 1060. For this, more address lines may be added to the address lines M_ADDR to increase the address space for the memory bus. To prevent memory-interface manager 1060 from accessing the added address space, manager 1060 may output a preset bit pattern on the added address lines that uniquely select memory unit MU instead of other memory units on the memory bus. Also, additional address decoding circuitry can be added to memory unit MU to detect the presence of the preset bit pattern on the added address lines so that memory unit MU knows when it is being addressed by memory interface manager 1060.

Memory-interface manager 1060, which can be implemented as a hardware state machine, mini-microprocessors, and the like, idles in a base state monitoring the empty-buffer output of transaction buffer 1030 (via line TR_EMP) for an indication that a transaction word is present in the buffer. Once a transaction word is detected, manager 1060 reads the word by sending an active signal to the output-enable port of transaction buffer 1030 via line TR_OUT_EN and reading buffer 1030's buffer output via lines TR_OUT_DATA(32). Memory-interface manager 1060 thereafter processes the transaction word, as described below in greater detail. To accomplish its tasks, memory-interface manager 1060 has inputs and outputs coupled to the output sides of buffers 1030, 1040, and 1050, as shown in FIG. 11.

When memory-interface manager 1060 reads a "read" transaction word, as determined by bit TW[6] being "0," it accesses the memory location in memory unit MU specified by the address stored in bits TW[31:16] and any subsequent memory locations as needed to fulfill the requested data size and burst length. Memory-interface manager 1060 then inputs the read data into read buffer 1050, after which bus-interface manager 1010 takes it and outputs it on interface bus "A," as described above. To read data from memory unit MU in accordance with a read transaction word, memory-interface manager 1060 can execute the following sequence of steps using a temporary register MI_TEMP[15:0]:

1. Load the contents of the transaction word bits TW[31:16] into temporary register MI_TEMP[15:0].
2. Execute actions #3 through #5 for the number of bursts L specified by transaction word bits TW[15:12].
3. Execute a read operation (M_R/W=1 and M_REQ active) of memory unit MU with the contents of temporary register MI_TEMP[15:2] provided to address lines M_ADDR[13:0].
4. Transfer the read word from lines M_RD_D[31:0] to the buffer input of read buffer 1050 via lines RD_IN_DATA(32) and generate an active signal to buffer 1050's input-enable port via line RD_IN_EN.
5. Increment the value of temporary register MI_TEMP[15:0] by one if TW[10:8] specifies "byte" as the data size, by two if TW[10:8] specifies "half-word" as the data size, or by four if TW[10:8] specifies "word" as the data size.

After the sequence of actions is completed, memory-interface manager 1060 returns to its base state. Each of the actions #3-#5 can be done during the internal clock cycle used by memory-interface manager 1060, the internal clock typically being different from the cycles of clock signals BUSCLK. Above action #4 may also include checking the full-buffer output of read buffer 1050 (via line RD_FL) to make sure there is room to write data; if not, memory-interface manager 1060 can enter some wait states until a word is removed from read buffer 1050 by bus-interface manager 1010. The above sequence of actions can be readily implemented in a state machine. We note that if TW[10:8] specifies a byte data size or half-word data size, the data bursts of several adjacent words stored into read buffer 1050 will be duplicative. However, the requesting device will sort out the duplications, and/or bus-interface manager 1010 will sort out the duplications when it outputs the bursts onto interface bus "A" by setting the group-enable lines to indicate which bytes of the burst are to be used by the requesting device, as described above.

When memory-interface manager 1060 reads a "write" transaction word, as determined by bit TW[6] being "1," it obtains the write data stored in write buffer 1040 (from the ping-pong FIFO indicated by transaction-word bit TW[5]), and writes the data to memory unit MU with the appropriate settings of the byte-enable lines M_BE[3:0]. To do this, memory-interface manager 1060 can execute the following sequence of actions using a temporary register MI_TEMP[15:0]:

1. Load the contents of the transaction word bits TW[31:16] into temporary register MI_TEMP[15:0].

2. Execute actions #3 through #6 for the number of bursts L specified by transaction word bits TW[15:12].
3. Obtain a word of write data stored in write buffer 1040 from its buffer output via lines WR_OUT_DATA(32) by generating an active signal on buffer 1040's first enable-output port via line WR_OUT_EN[0], and by sending the value of the transaction-word bit TW[5] to buffer 1040's second enable-output port via line WR_OUT_EN[1] to select the ping-pong FIFO that has the data.
4. Generate values for M_BE[3:0] as a function of TW[10:8] (data size) and the two least significant bits in temporary register MI_TEMP[1:0] according to the mapping shown in TABLE V below.
5. Execute a write operation (M_R/W=0 and M_REQ active) of memory unit MU with the contents of temporary register MI_TEMP[15:2] provided to address lines M_ADDR[13:0], with the word of write data obtained from write buffer 1040 provided to write-data lines M_WR_D[3 1:0], and with the generated values for the byte-enable lines provided on the M_BE[3:0] lines.
6. Increment the value of temporary register MI_TEMP [15:0] by one if TW[10:8] specifies "byte" as the data size, by two if TW[10:8] specifies "half-word" as the data size, or by four if TW[10:8] specifies "word" as the data size.

After the sequence of actions is completed, memory-interface manager 1060 returns to its monitoring state. The actions #3-#6 can be done during one or more of the internal clock cycles used by memory-interface manager 1060, the internal clock typically being different from the cycles of clock signals BUSCLK. Action #3 may further include checking the selected ping-pong buffer to make sure that it has data to output before it is read. This may be done by monitoring the value of the WR_EMP signal for the selected ping-pong buffer. Wait states can be included to wait for data to appear in the FIFO. However, this is generally not needed when bus-interface manager 1010 writes the write data to write buffer 1040 before writing the write transaction word to transaction buffer 1030. The above sequence of actions can be readily implemented in a state machine.

TABLE V

| TW[10:8] | MI_TEMP [1:0] | M_BE[0] | M_BE[1] | M_BE[2] | M_BE[3] |
|---|---|---|---|---|---|
| 0 0 0 | 0 0 | 0 | 1 | 1 | 1 |
| 0 0 0 | 0 1 | 1 | 0 | 1 | 1 |
| 0 0 0 | 1 0 | 1 | 1 | 0 | 1 |
| 0 0 0 | 1 1 | 1 | 1 | 1 | 0 |
| 0 0 1 | 0 0 | 0 | 0 | 1 | 1 |
| 0 0 1 | 0 1 | -- Not permitted -- | | | |
| 0 0 1 | 1 0 | 1 | 1 | 0 | 0 |
| 0 0 1 | 1 1 | -- Not permitted -- | | | |
| 0 1 0 | All values | 0 | 0 | 0 | 0 |

Given the above description of structure and actions, it is well within the ability of one of ordinary skill in the art to construct electrical circuitry, state machines, mini-microprocessors, and the like to implement each of the components of bus bridge 1000, including bus-interface managers 1010 and 1020, memory interface manager 1060, and buffers 1030, 1040, and 1050.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An interface bus comprising:
   a set of address lines to convey a selection of one of a plurality of memory locations as a selected memory location for a data-transfer operation on the bus, the selection being based on an address value presented on the address lines by a device coupled to the bus;
   at least one read/write line to convey an indication of whether a first type of data-transfer operation is to be performed on the interface bus, the first type of data-transfer operation either comprising a read operation of a selected memory location or comprising a write operation of a selected memory location;
   N groups of data lines for conveying the data to be transferred in a data-transfer operation involving a selected memory location, N being at least two; and
   g group-enable lines for conveying indications of which groups of data lines are to be used in a data-transfer operation involving a selected memory location, wherein the group-enable lines are operable to convey an indication that at least two groups of data lines are to be used together in a data-transfer operation, and further operable to convey separate indications that each of the at least two groups is to be used alone in separate data-transfer operations.

2. The interface bus of claim 1 wherein the first type of data-transfer operation comprises a read operation, wherein the interface bus includes a second type of operation in the form of a write operation, and wherein the at least one read/write line has a first state for indicating a read operation and a second state for indicating a write operation.

3. The interface bus of claim 1 wherein each group of data lines has eight data lines.

4. The interface bus of claim 3 wherein N is equal to four.

5. The interface bus of claim 4, wherein each group of data lines and its corresponding group-enable line are associated with a unique bit pattern on the two least significant bits of the address lines.

6. The interface bus of claim 1 wherein the number g of group-enable lines is equal to the number N of groups of data lines, and wherein each group-enable line corresponds to a group of data lines and provides a representation of whether the corresponding group of data lines is to be used in a data-transfer operation involving a selected memory location.

7. The interface bus of claim 1 further comprising a data-transfer enable line to convey a signal indicating the start of a data-transfer operation.

8. The interface bus of claim 1 wherein the first type of data-transfer operation comprises a read operation, and wherein the interface bus further comprises a read-ready line to convey a signal indicating that the data requested by a read operation is ready.

9. The interface bus of claim 1, wherein each group of data lines and its corresponding group-enable line are associated with a unique bit pattern on one or more of the least significant bits of the address lines.

10. An interface bus capable of conveying a number of L bursts of data in serial form from one device to another device, the L bursts of data being associated with a plurality of memory locations that includes a selected memory location, the number L being equal to or greater than one, the interface bus comprising:
- a set of address lines to convey a selection of one of a plurality of memory locations as a selected memory location for a data-transfer operation on the bus, the selection being based on an address value presented on the address lines by a device coupled to the bus;
- at least one read/write line to convey an indication of whether a first type of data-transfer operation is to be performed on the interface bus, the first type of data-transfer operation either comprising a read operation of a selected memory location or comprising a write operation of a selected memory location;
- one or more burst-length lines to convey a value representative of the number of L bursts of data to be conveyed in serial form over the bus; and
- a plurality of data lines to convey L bursts of data in serial form; and
- wherein a number of L bursts of data are conveyed in serial form over the data lines, the L bursts of data being associated with a plurality of memory locations that includes the selected memory location.

11. The interface bus of claim 10 further comprising a clock line to convey a clock signal that comprises cycles, each cycle comprising a first state and a subsequent second state; and wherein each burst of data of the L bursts is conveyed on the data lines during a respective cycle of the clock signal.

12. The interface bus of claim 11 further comprising a clock line to convey a clock signal that comprises cycles, each cycle comprising a first state and a subsequent second state; and wherein each burst of data of the L bursts is conveyed on the data lines during a respective cycle of the clock signal.

13. The interface bus of claim 10 wherein the first type of data-transfer operation comprises a read operation.

14. The interface bus of claim 13 further comprising a read-ready line to convey a signal indicating that the data requested by a read operation is ready.

15. The interface bus of claim 14 further comprising a clock line to convey a clock signal that comprises cycles, each cycle comprising a first state and a subsequent second state; and wherein each burst of data of the L bursts is conveyed on the data lines during a respective cycle of the clock signal.

16. The interface bus of claim 10 wherein the data lines are divided into N groups, and wherein the interface bus further comprises N group-enable lines, each group-enable line corresponding to a group of data lines and providing a representation of whether the corresponding group of data lines is to be used in a data-transfer operation involving a selected memory location.

17. The interface bus of claim 16 wherein the first type of data-transfer operation comprises a read operation;
- wherein each group of data lines comprises a number p of digital data bits,
- wherein each memory location has said number p of digital data bits, and
- wherein, when the group-enable lines indicate that G groups of data lines are to be used in a data-transfer operation, a number of memory locations equal to the quantity $G*L$ are read for the data-transfer operation, including the selected memory location.

18. The interface bus of claim 16 wherein the first type of data-transfer operation comprises a write operation;
- wherein each group of data lines comprises a number p of digital data bits,
- wherein each memory location has said number p of digital data bits, and
- wherein, when the group-enable lines indicate that G groups of data lines are to be used in a data-transfer operation, a number of memory locations equal to the quantity $G*L$ are written to as a result of the data-transfer operation, including the selected memory location.

19. The interface bus of claim 10 wherein the first type of data-transfer operation comprises a write operation.

* * * * *